United States Patent
Hatakeyama et al.

(10) Patent No.: US 6,792,522 B2
(45) Date of Patent: Sep. 14, 2004

(54) DATA DRIVEN INFORMATION PROCESSOR CARRYING OUT PROCESSING USING PACKET STORED WITH PLURALITY OF OPERAND DATA

(75) Inventors: Kouichi Hatakeyama, Nara (JP); Kisho Takamatsu, Kochi (JP)

(73) Assignee: Sharp Kabushiki Kaisha, Osaka (JP)

( * ) Notice: Subject to any disclaimer, the term of this patent is extended or adjusted under 35 U.S.C. 154(b) by 716 days.

(21) Appl. No.: 09/805,164

(22) Filed: Mar. 14, 2001

(65) Prior Publication Data

US 2001/0029576 A1 Oct. 11, 2001

(30) Foreign Application Priority Data

Mar. 29, 2000 (JP) ........................................ 2000-090871

(51) Int. Cl.$^7$ .............................................. G06F 15/82
(52) U.S. Cl. .......................................... 712/25; 712/26
(58) Field of Search ..................................... 712/25, 26

(56) References Cited

U.S. PATENT DOCUMENTS

| | | | | |
|---|---|---|---|---|
| 5,021,947 A | * | 6/1991 | Campbell et al. | 712/25 |
| 5,093,919 A | * | 3/1992 | Yoshida et al. | 712/25 |
| 5,327,569 A | * | 7/1994 | Shima et al. | 712/26 |
| 5,341,506 A | * | 8/1994 | Nohmi et al. | 712/26 |
| 5,392,442 A | * | 2/1995 | Komori et al. | 712/26 |
| 5,542,080 A | * | 7/1996 | Yoshida | 712/25 |
| 5,794,065 A | * | 8/1998 | Hatakeyama et al. | 712/26 |
| 5,872,991 A | * | 2/1999 | Okamoto et al. | 712/26 |
| 6,243,800 B1 | * | 6/2001 | Burtsev et al. | 712/25 |

FOREIGN PATENT DOCUMENTS

JP        A9114664        5/1997

* cited by examiner

Primary Examiner—William M. Treat
(74) Attorney, Agent, or Firm—Birch, Stewart, Kolasch & Birch, LLP

(57) ABSTRACT

In a data driven information processor, an operation apparatus includes a data select unit and a flag select unit selecting information according to the value of flag data in an input data packet. The data select unit selects the processed result for each data in the input data packet or the data itself. The flag select unit selects the flag data set with a value according to the processed result or the flag data of the input data packet. The selected information is stored in the input data packet, which is output to a program storage unit. Accordingly, the processed result can be obtained for certain data selected out of a plurality of data in the data packet to be reflected in the subsequent operation process without dividing the data packets.

6 Claims, 16 Drawing Sheets

FIG.5A

| OUTPUT OF ADD (210) | |
|---|---|
| PROCESSED RESULT (i) | LDi + RDi |
| FLAG OUTPUT (h) | WHEN (LDi + RDi) > 0, 1 OTHERWISE, 0 |

FIG.5B

| OUTPUT OF SUB (211) | |
|---|---|
| PROCESSED RESULT (i) | LDi - RDi |
| FLAG OUTPUT (h) | WHEN (LDi - RDi) > 0, 1 OTHERWISE, 0 |

FIG.5C

| OUTPUT OF MAX (212) | |
|---|---|
| PROCESSED RESULT (i) | GREATER OF LDi/RDi |
| FLAG OUTPUT (h) | WHEN LDi > RDi, 1 OTHERWISE, 0 |

FIG.5D

| OUTPUT OF MIN (213) | |
|---|---|
| PROCESSED RESULT (i) | SMALLER OF LDi/RDi |
| FLAG OUTPUT (h) | WHEN LDi < RDi, 1 OTHERWISE, 0 |

*FIG.6A* PRIOR ART  *FIG.6B*
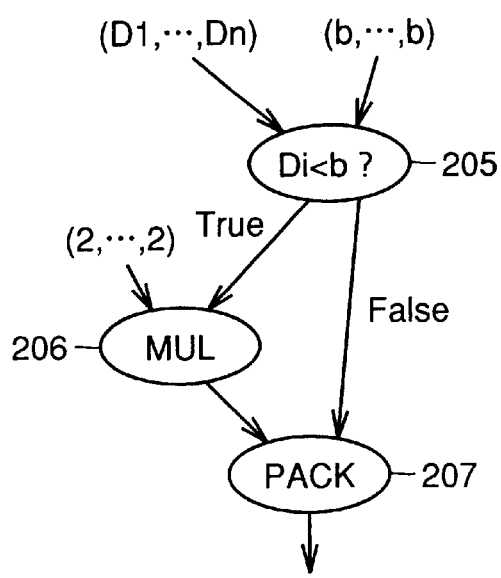
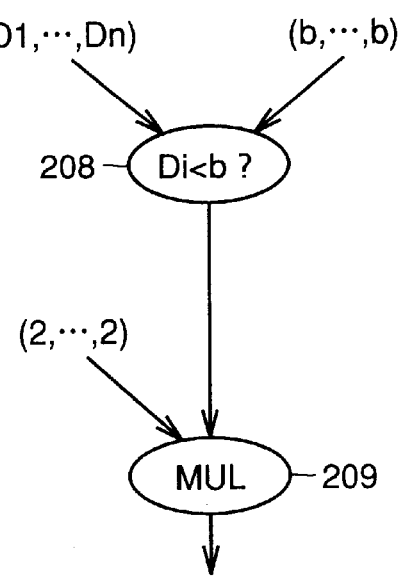

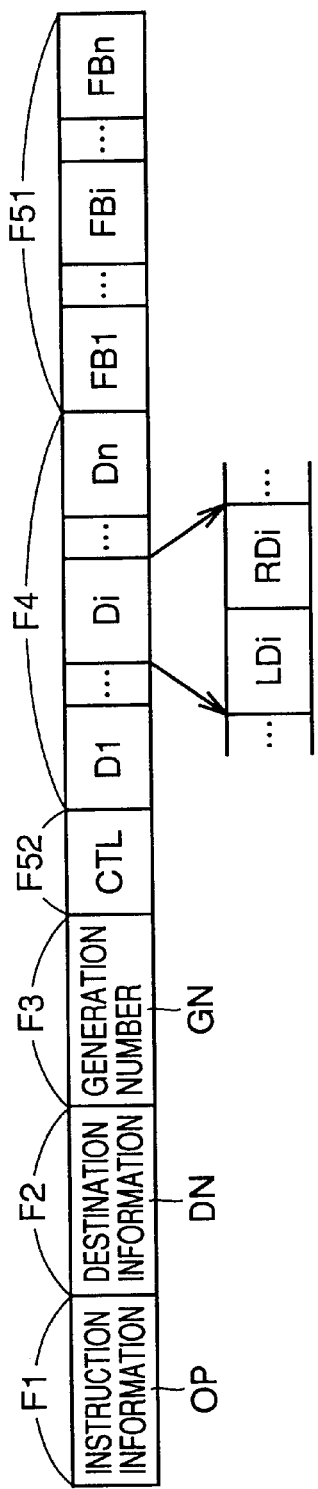
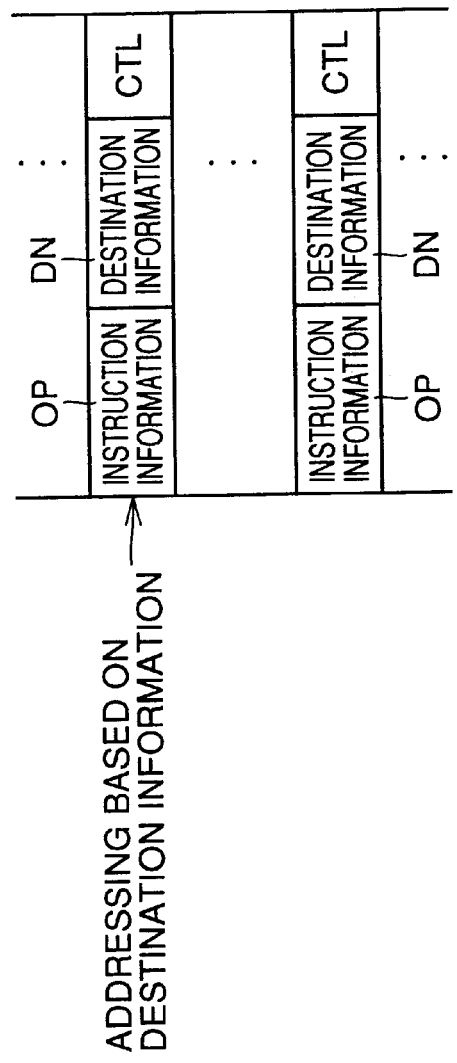
FIG.8A
FIG.8B
FIG.8C

FIG.9A
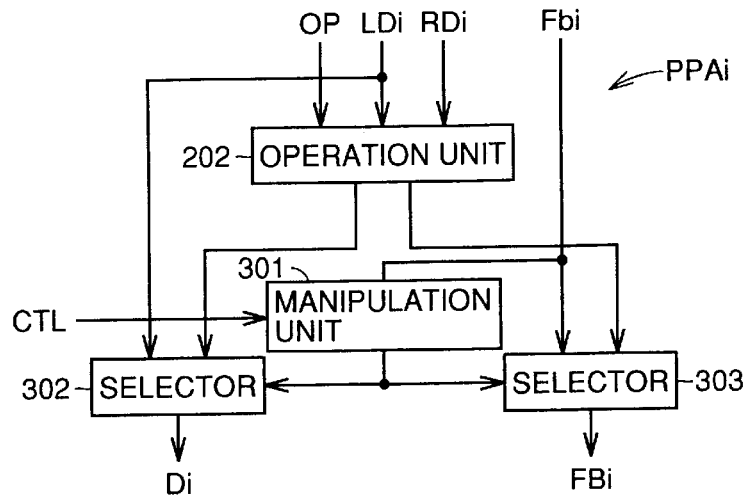
FIG.9B
| CTL | OUTPUT OF MANIPULATION UNIT 301 |
|---|---|
| 0 | 1 (EXECUTE OPERATION UNCONDITIONALLY) |
| 1 | REFERENCE OF Fbi |
| 2 | REFERENCE OF (1 - Fbi) |
| 3 | 0 (NONEXECUTABLE UNCONDITIONALLY) |
FIG.10A
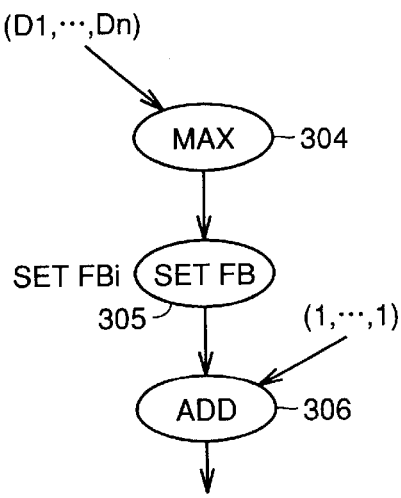
FIG.10B
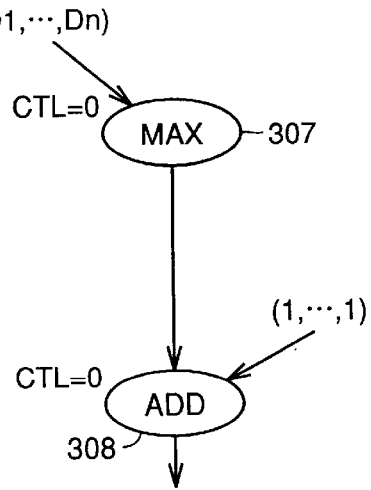

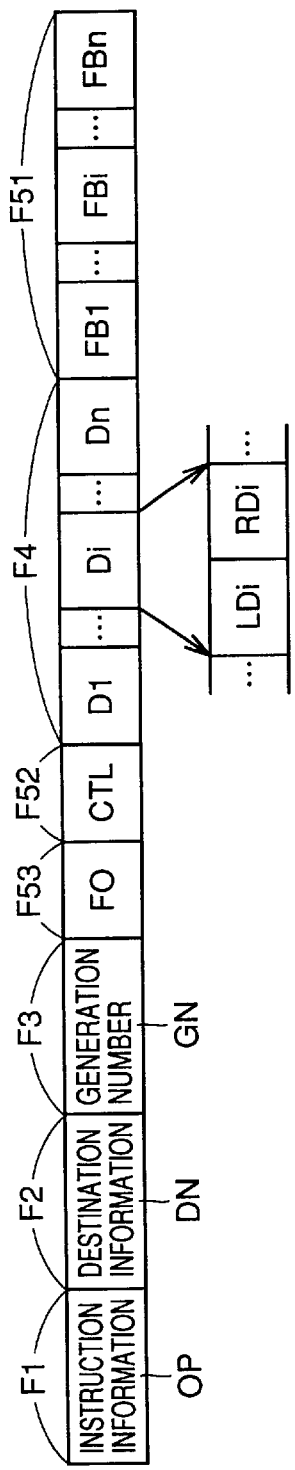
FIG.12A
FIG.12B
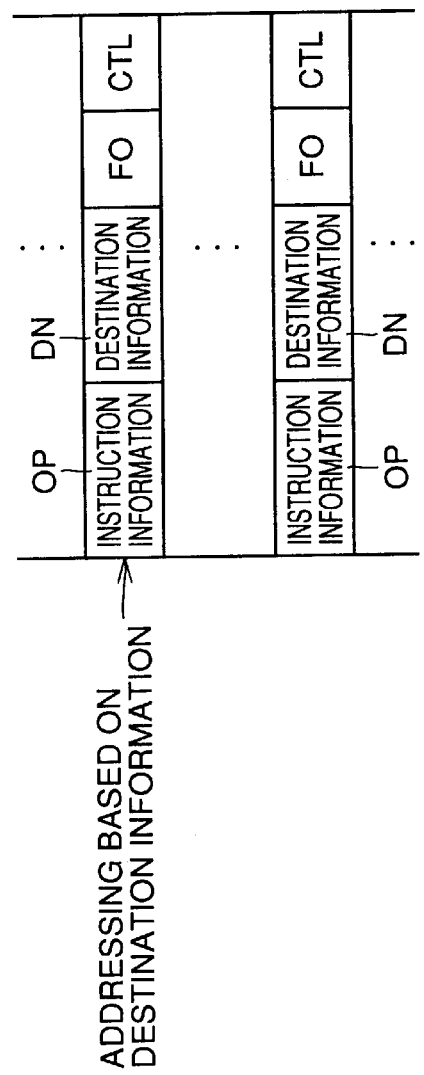
FIG.12C

FIG.13A
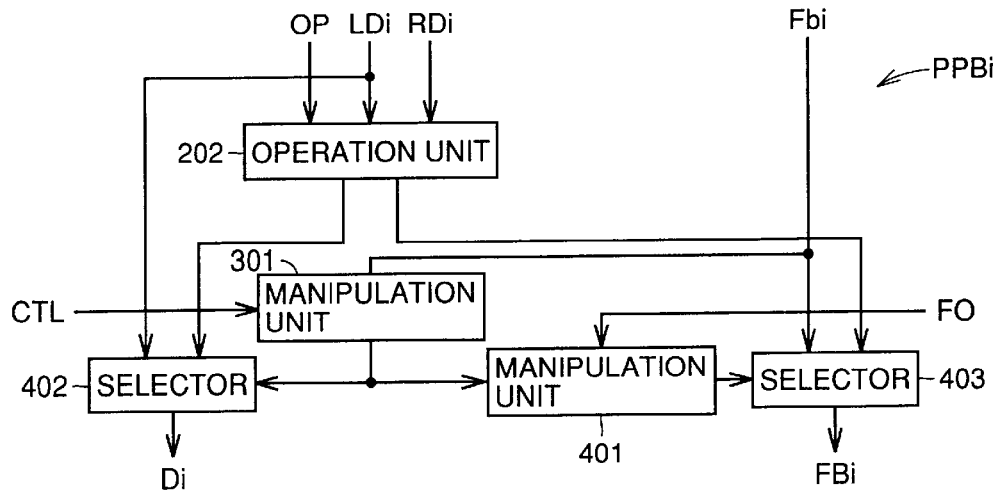
FIG.13B
| FO | OUTPUT OF MANIPULATION UNIT 401 |
|---|---|
| 0 | 0 |
| 1 | OUTPUT OF MANIPULATION UNIT 301 |
FIG.14A
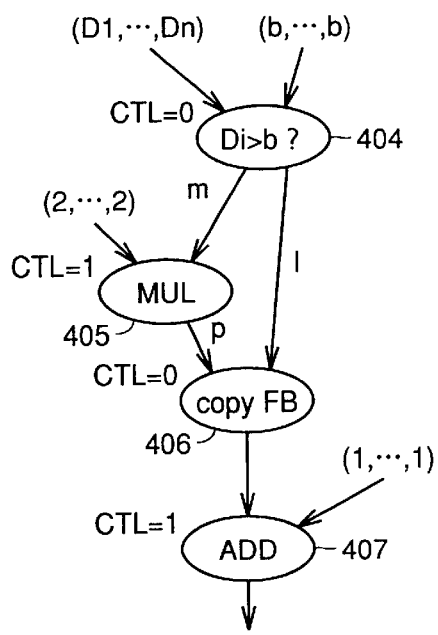
FIG.14B
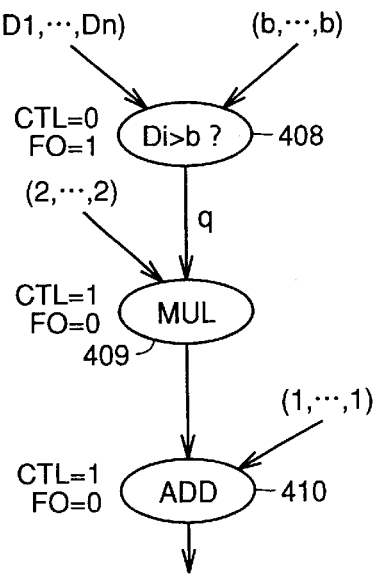

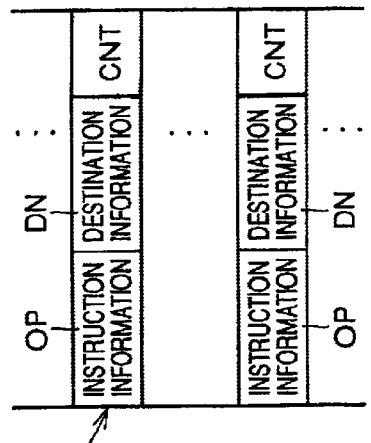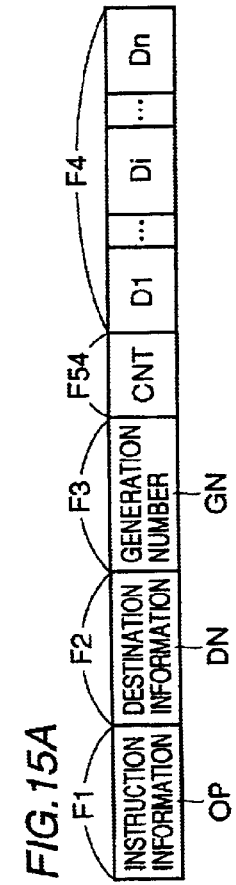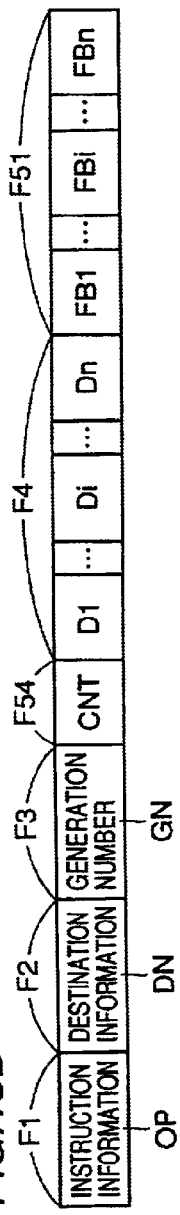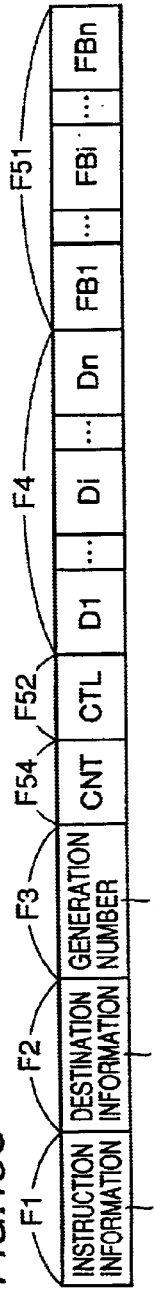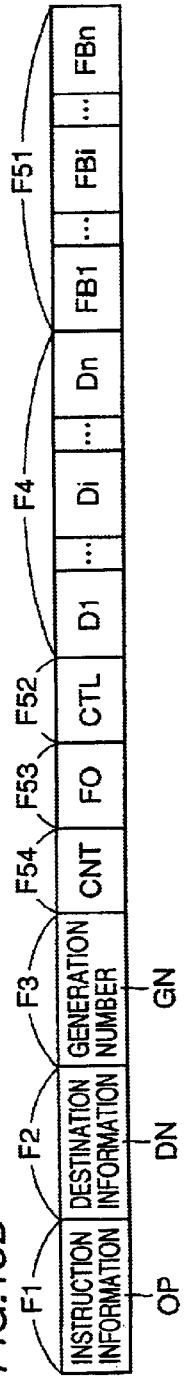

|  | OUTPUT OF SELECTOR i |
|---|---|
| WHEN CNT ≤ n | OUTPUT OF OPERATION UNIT i |
| WHEN CNT > n | LDi |

DATA DRIVEN INFORMATION PROCESSOR CARRYING OUT PROCESSING USING PACKET STORED WITH PLURALITY OF OPERAND DATA

BACKGROUND OF THE INVENTION

1. Field of the Invention

The present invention relates to data driven information processors, and particularly to a data driven information processor that carries out processing using a data packet in which a plurality of operand data are stored.

2. Description of the Background Art

FIGS. 18A–18D show the structure of a conventional data driven information processor and a data packet disclosed in Japanese Patent Laying-Open No. 9-114664.

Referring to FIG. 18A, a conventional data driven information processor includes an input unit 100 to which a port Pi (i=1, 2, 3, . . . n) is connected to input external data, a junction unit 101, a paired data detection unit 102, an operation apparatus 103, a program storage unit 104 and a branch unit 105.

FIG. 18B is a block diagram of a portion of operation apparatus 103. FIGS. 18C and 18D show respective examples of the field structure of a conventional data packet.

The data packet of FIG. 18C includes a field F1 storing instruction information OP, a field F2 storing destination information DN, a field F3 storing a generation number GN, and a field F4 storing at least one data Di (i=1, 2, 3, . . . n).

In program storage unit 104 of FIG. 18A, a data flow program is prestored. The data flow program includes a plurality of program data corresponding to a set of instruction information OP and destination information DN.

Instruction information OP serves to identify the operation executed on the contents of corresponding data field F4. Destination information DN is used to read out the subsequent program data from program storage unit 104. Reading out program data from program storage unit 104 is referred to as "program fetch" hereinafter. Generation number GN serves to identify a plurality of data packets having the same destination information DN. Data Di implies a plurality of data applied to input unit 100 via port Pi, corresponding in number to the number of ports Pi. In this example, the plurality of data Di in field F4 share the same instruction information OP, destination information DN and generation number GN.

When data Di which is a portion of data in field F4 of the data packet is to be used in the operation in the data driven information processor of FIG. 18A, the field structure of the data packet shown in FIG. 18D is employed. In the data packet of FIG. 18D, a data field F50 is provided instead of data field F4 of FIG. 18C. The remaining field structure of FIG. 18D is similar to that of FIG. 18C, and description thereof will not be repeated. Field F50 includes a flag V corresponding to each data Di. Flag V indicates whether the corresponding data Di is to be used in the operation, i.e., valid data, or not used in the operation, i.e. invalid data.

Input unit 100 of FIG. 18A receives plurality of data individually through port Pi serving to input externally applied data to the data driven information processor. The data is stored in field F4 in one data packet of FIG. 18C. Then, that data packet is output. Junction unit 101 arbitrates and inputs the data packets output from input unit 100 and branch unit 105, which is sequentially output to paired data detection unit 102. Paired data detection unit 102 effects the matching operation of the data packets applied from junction unit 100. As to the data packets forming a pair, i.e. two different data packets with matching destination information DN, the contents in data field F4 of one data packet is stored in data field F4 of the other data packet, and that other data packet is output. Accordingly, data Di that is to become the two operand data for a dyadic operation, for example, is detected as the paired data. Here, one of the paired data is referred to as LDi (i=1, 2, 3, . . . n) and the other of the paired data is referred to as RDi (i=1, 2, 3, . . . n).

Operation apparatus 103 receives the data packet output from paired data detection unit 102 to decode instruction information OP in the received data packet and applies a predetermined processing on data Di stored in data field F4 in the received data packet according to the decoded result. The result is stored in data field F4 of the received data packet to be output.

Program storage unit 104 receives the data packet output from operation apparatus 103 to read out the subsequent destination information DN and the subsequent instruction information OP from the data flow program according to addressing based on destination information DN of the received data packet. The readout information are stored in fields F2 and F1, respectively, of the received data packet. Then, that data packet is output. Branch unit 105 receives the data packet output from program storage unit 104 to provide that data packet outside of the data driven information processor or to junction unit 101 according to destination information DN in the received data packet.

Operation apparatus 103 includes a plurality of operation units OPUi (i=1, 2, 3, . . . n) to which the paired data (LDi and RDi) and instruction information OP of the data packet input to operation apparatus 103 are applied. Each operation unit (OPUi) simultaneously processes each corresponding paired data according to instruction information OP. The processed result is output as data Di. Output data Di is each stored in field F4 of the input data packet. Then, that data packet is output.

In the above-described conventional data driven information processor, a plurality of operation units (OPUi) that carry out the same operation on each data Di in the data packet are prepared. These operation units (OPUi) carry out processing based on common instruction information OP. This means that all data Di in the data packet are unconditionally subjected to the same operation. In order to apply an operation only on desired data Di in data field F4, the data packet must be divided prior to the operation to carry out a predetermined operation on the desired data Di by a corresponding operation unit (OPUi), followed by a combining process for the divided data packets. Thus, the process becomes redundant in the conventional data driven information processor for an operation that is to be applied only on desired data Di in data field F4.

To apply an operation only on desired data Di in the conventional data driven information processor, the data packet of FIG. 18D is used to effect the operation selectively on data Di having a flag V that indicates valid data, i.e. on only the desired data Di. By employing this method, redundancy of the process is eliminated since the dividing and combining processes of the data packets are not required. However, the size of the data packet becomes larger since the region to store flag V is additionally required for each data Di in the data packet. The width of the data transmission path of the data driven information processor is increased to obviate reduction in the size of the processor.

SUMMARY OF THE INVENTION

An object of the present invention is to provide a data driven information processor that can improve the efficiency of computing operation using a data packet in which a plurality of operand data are stored.

To achieve the above object, the data driven information processor of the present invention includes a paired data detection unit, a processing unit, and a control unit. The paired data detection unit sequentially receives a data packet including at least a destination field to store destination information, an instruction field to store instruction information, and a data field to store a plurality of data independent of each other to detect two different received data packets forming a pair. The contents of the data field of one received data packet detected as a pair are stored into the data field of the other input packet detected as the pair. Then, that other data packet is output.

The processing unit receives the data packet output from the paired data detection unit to apply operation individually on each of the plurality of data in the data field of the received data packet according to the instruction information in the information field. Then, that received data packet is output.

The control unit includes a program storage unit in which a data flow program including a plurality of instruction information and destination information are stored. In operation, the control unit receives the data packet output from the processing unit to store the subsequent instruction information and subsequent destination information read out from the program storage unit into the instruction field and destination field of the received data packet. That received data packet is output to at least the paired data detection unit. The data driven information processor of the above-described structure is characterized as set forth in the following.

The data packet further includes a reflect designation field. Corresponding to each of the plurality of data in the data field, reflect designation information designating whether to reflect the result of the data processed in the process according to the subsequent instruction information is stored in the reflect designation field. The processing unit includes a data select unit and information select unit corresponding to each of the plurality of data in the received data packet. The data select unit selects corresponding data in response to the reflect designation information in the received data packet designating non-reflection, and selects the processed result of corresponding data in response to the reflect designation information designating reflection, and stores the selected result in the data field of the received data packet. The information select unit selects the reflect designation information in response to the reflect designation information of the received data packet designating non-reflection and selects the reflect designation information set with contents corresponding to the processed result of the corresponding data in response to the reflect designation information designating reflection, and stores the reflect designation information of the selected result in the reflect designation field of the received data packet.

According to the data driven information processor of the present aspect, the data select unit and information select unit of the processing unit operate as set forth in the following when an operation process is executed according to the instruction information on the plurality of data in the received data packet. Using the corresponding reflect designation information, data that is designated to reflect the processed result in the process by the subsequent instruction information out of the plurality of data has its processed result and the reflect designation information set with contents according to the processed result stored in the received data packet, which is then output.

In the case where the processed result is to be obtained for only data that is to have the processed result reflected in the subsequent process out of the plurality of data in the data packet in the data driven information processor of the present aspect, the processing steps of dividing and combining the data packet is omitted. Therefore, the amount of data of the executed program and the number of data packets to be processed can be reduced in the data driven information processor, whereby the processing speed and processing efficiency are improved.

The data driven information processor of the present aspect is further characterized as set forth in the following. The data packet further includes a manipulation field in which is stored manipulation information to manipulate the contents of the reflect designation information in the reflect designation field. The processing unit further includes a manipulation unit. The manipulation unit manipulates the contents of the reflect designation information corresponding to each of the plurality of data in the data packet applied to the processing unit, based on the manipulation information in the applied data packet, and supplies the reflect designation information of the manipulated result to at least one of the data select unit and information select unit.

According to the data driven information processor of the present aspect, the processing unit has the contents of the reflect designation information in the input data packet manipulated by the manipulation unit based on the manipulation information, and applies the manipulated reflect designation information to at least one of the data select unit and information select unit.

When operation processing is executed according to the subsequent instruction information, at least one of the data select unit and information select unit is under control by the processing unit as set forth in the following based on the manipulation information irrespective of the reflect information set with the contents according to the processed result by the instruction information executed immediately before. Specifically, the data select unit can select data of the input data packet or select the processed result using the subsequent instruction information of the data. The information select unit can select the reflect designation information of the input data packet (in other words, retain (copy) the contents of the reflect designation information) or select reflect designation information set with contents according to the processed result of the subsequent instruction information.

Thus, even in the case where processing is carried out on the same data according to the same instruction information in the data driven information processor, a processed result similar to that where a plurality of types of instruction information are executed can be obtained by using manipulation information. Therefore, the types of instruction information required in information processing can be reduced. This means that processing similar to that of the conventional case can be executed using fewer instruction information. The processing speed can be improved and the program storage region can be reduced.

In the data driven information processor of the present aspect, the data packet further includes a data number field. Data number information indicating the number of data required to be subjected to an operation process out of the plurality of data in the data field is stored in the data number field. The data number field has a bit length corresponding to the number of the plurality of data to store the data number information. In the processing unit, a data select unit and information select unit corresponding to the number of data indicated by the data number information operate.

Therefore, the operation processed result and corresponding reflect designation information can be obtained for only the number of data that is to be subjected to the operation process. This provides the advantageous effect described in the following. Conventionally, information of one bit indicating whether an operation process is desired or not was added for each of the plurality of data in order to obtain the processed result for only the desired number of data to be subjected to the operation process. In contrast, the data number field in the data packet requires only the bit length corresponding to the number of the plurality of data in the data driven information processor of the present invention. Therefore, when there are at least three data, the length of the data packet can be reduced in comparison to the conventional case. Accordingly, the time required for data packet transmission and reading/writing the contents can be reduced in the data driven information processor of the present invention to improve the processing speed.

By the above-described data number information, the desired number of data that is to be subjected to an operation process can be identified out of the plurality of data in the data field.

According to another aspect of the present invention, a data driven information processor includes a paired data detection unit, a processing unit, and a control unit. The paired data detection unit sequentially receives a data packet including at least a destination field to store destination information, an instruction field to store instruction information and a data field to store a plurality of data independent of each other to detect two different received data packets forming a pair. The contents of the data field of one received packet detected as a pair are stored into the data field of the other received data packet of the detected pair. Then, the other data packet is output.

The processing unit receives the data packet output from the paired data detection unit to apply an operation process according to the instruction information in the instruction field on each of the plurality of data in the data field in the received data packet. Then, that received data packet is output.

The control unit includes a program storage unit in which is stored a data flow program including a plurality of instruction information and destination information. In operation, the control unit receives the data packet output from the processing unit to store the subsequent instruction information and subsequent destination information read out from the program storage unit into the instruction field and destination field, respectively, of the received data packet. That received data packet is output to at least the paired data detection unit. The data driven information processor of the above-described structure is characterized as set forth in the following.

The data packet further includes a data number field. The data number field has a bit length corresponding to the number of the plurality of data to store the number of desired data information indicating the number of data required to be subjected to an operation process. The processed result corresponding to the number of data indicated by the data number information out of the plurality of data is output to the processing unit.

Therefore, the processed result can be obtained for only the desired number of data that is to be subjected to an operation process. Conventionally, information of one bit indicating whether an operation process is required or not for each of the plurality of data is applied in the case where the processed result is to be obtained for only the desired number of data that is to be subjected to an operation process. In contrast, the data driven information processor of the present invention requires only the data length corresponding to the number of data in the data number field. The length of the data packet can be reduced than the conventional case when there are at least three data. Therefore, the time required for data packet transmission and reading/writing contents thereof can be reduced in the data driven information processor of the present invention to improve the processing speed.

Also, the number of data required to be subjected to an operation process out of the plurality of data in the data field can be identified by the data number information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A–5D show the output of each operation circuit of FIG. 4 in the form of a table.

FIGS. 6A and 6B are data flow graphs of the conventional case and of a first embodiment of the present invention, respectively, for a predetermined process.

FIGS. 8A–8C show structures of a data packet according to the second embodiment and a program storage unit accessed by such a data packet.

FIGS. 9A and 9B represent the structure and operation, respectively, of an operation device PPAi of FIG. 7.

FIGS. 10A and 10B are data flow graphs of a data flow program executed by the data driven information processor of the first embodiment and the second embodiment, respectively, for the same process.

FIGS. 12A–12C show the structure of a data packet according to the third embodiment and contents of a program storage region accessed by the contents of such a data packet.

FIGS. 13A and 13B represent the structure and operation, respectively, of an operation device PPBi of FIG. 11.

FIGS. 14A and 14B are data flow graphs according to the second embodiment and the third embodiment, respectively, for the same process.

FIGS. 15A–15E show a field structure of the data packet according to a fourth embodiment of the present invention and the program region accessed according to the contents of the data packet.

DESCRIPTION OF THE PREFERRED EMBODIMENTS

First to fourth embodiments of the present invention will be described in detail hereinafter with reference to the drawings.

First Embodiment

According to a first embodiment of the present invention, flag data FBi of 1 bit is allotted to each of the plurality of data Di in the data packet to reflect the processed result for data Di in the subsequent operation process. The processed result is obtained for only data Di corresponding to flag data FBi indicating a predetermined value. The processed result is stored in the data packet as data Di, and applied to the subsequent operation process. Therefore, the processed result can be reflected in the subsequent operation process.

Figure 1:
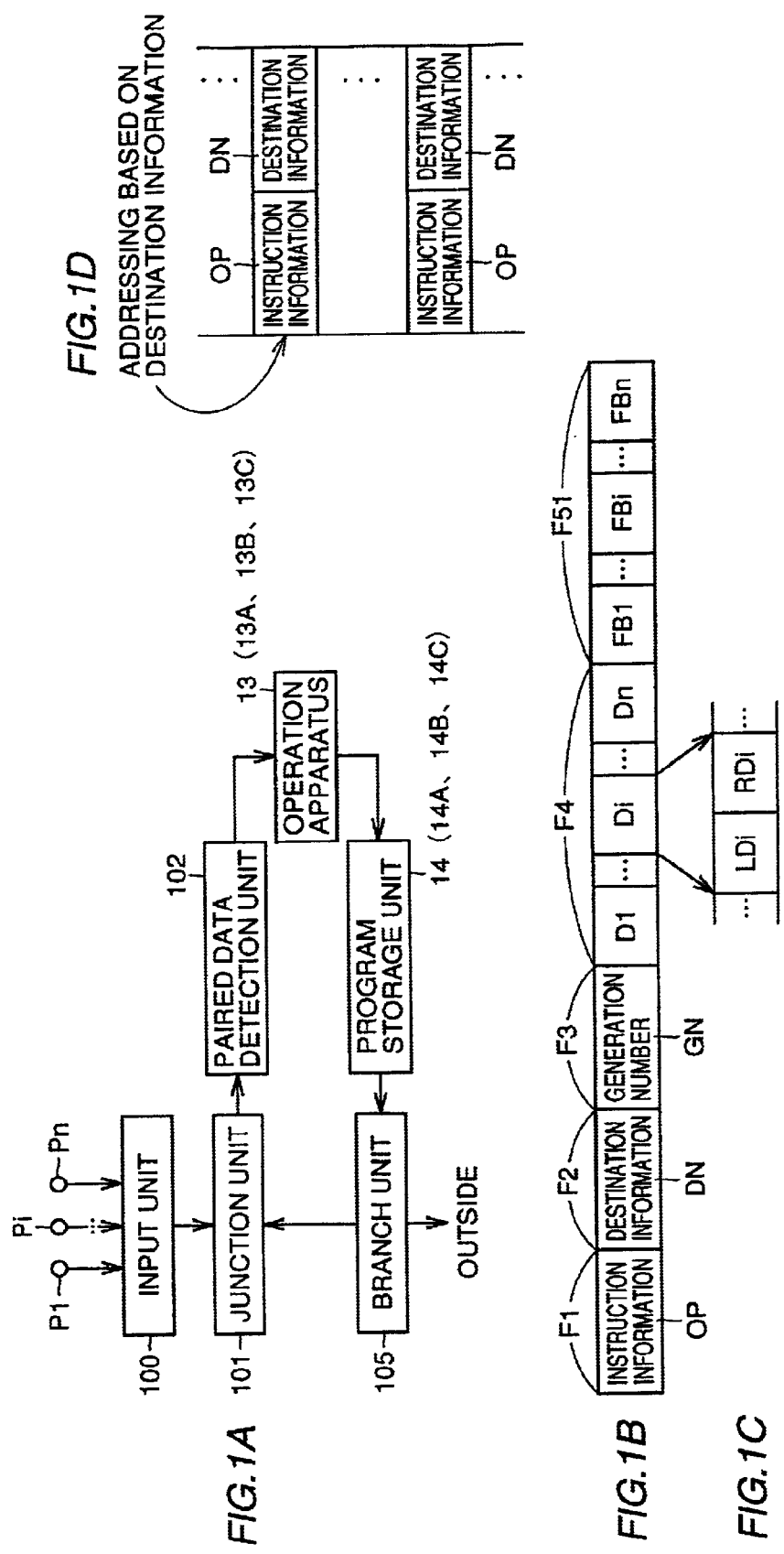
FIGS. 1A–1D show the block structure of a data driven information processor and a field structure of a data packet according to each embodiment of the present invention.
Figure 18A:
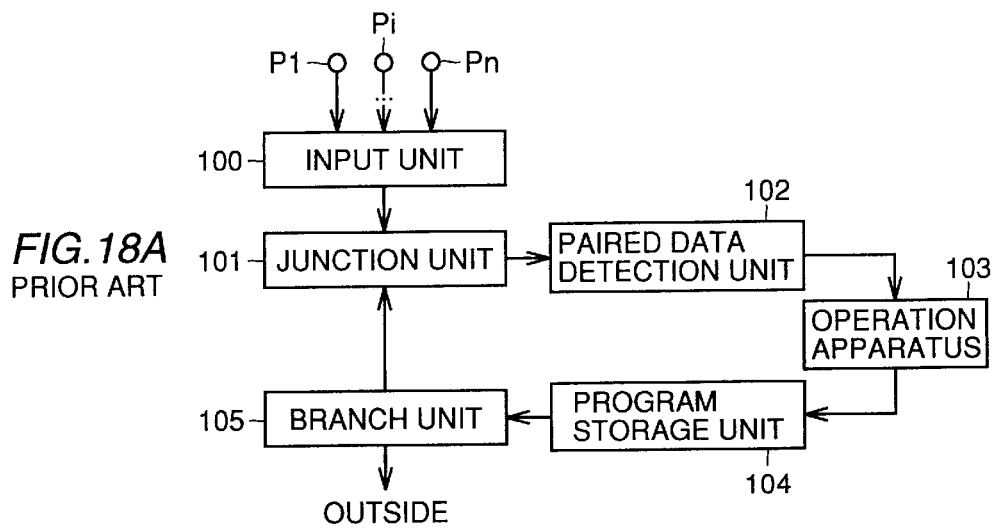
FIGS. 18A–18D show the structure of a conventional data driven information processor and data packets.
Figure 18B:
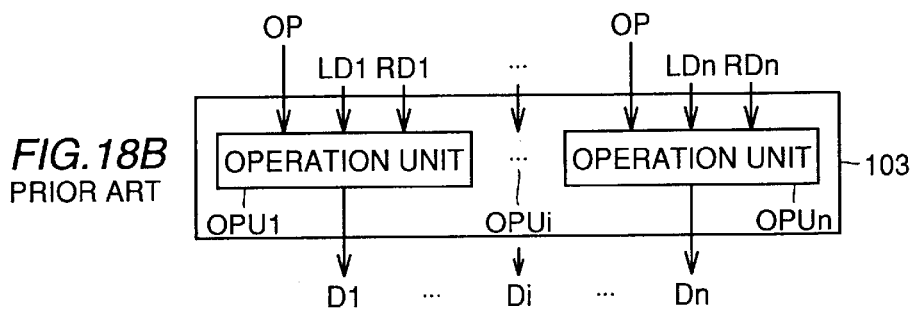
Figure 18C:
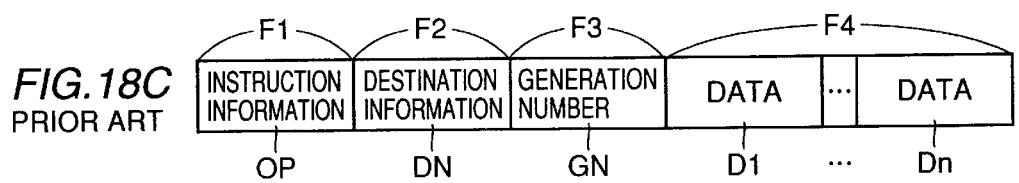

The data driven information processor according to each embodiment of FIG. 1A has a different structure for the operation apparatus and the program storage unit in each embodiment. The remaining components are common in each embodiment, and identical to those of FIG. 18A. Therefore, description thereof is not repeated. Each of operation apparatuses 13, 13A, 13B and 13C, and each of program storage units 14, 14A, 14B and 14C are applied in the first, second, third and fourth embodiment, respectively.

Referring to FIG. 1B, the data packet applied in the first embodiment includes a field F1 storing instruction information OP, a field F2 storing destination information DN, a field F3 storing generation number GN, a field F4 storing plurality of data Di independent of each other, and a field F51.

Field F51 has flag data FBi (i=1, 2, 3, . . . n) stored corresponding to each of data Di of field F4.

Although flag data FBi is indicated as 1-bit data, the number of bits is not limited thereto. Data Di in data field F4 is constituted by data LDi and RDi which form a paired data as shown in FIG. 1C after the detection of the paired data by paired data detection unit 102.

FIG. 1D shows a program storage region where a data flow program is stored in program storage unit 14. The data flow program includes a plurality of program data formed of the subsequent instruction information OP and destination information DN. Upon the input of the data packet of FIG. 1B, program storage unit 14 has the subsequent instruction information OP and destination information DN read out from the program storage region program fetch) by the addressing based on destination information DN of the input data packet and stored into fields F1 and F2, respectively, in the input data packet, which is then output. Accordingly, the subsequent instruction information OP and destination information DN are applied to the data packet.

Figure 2:
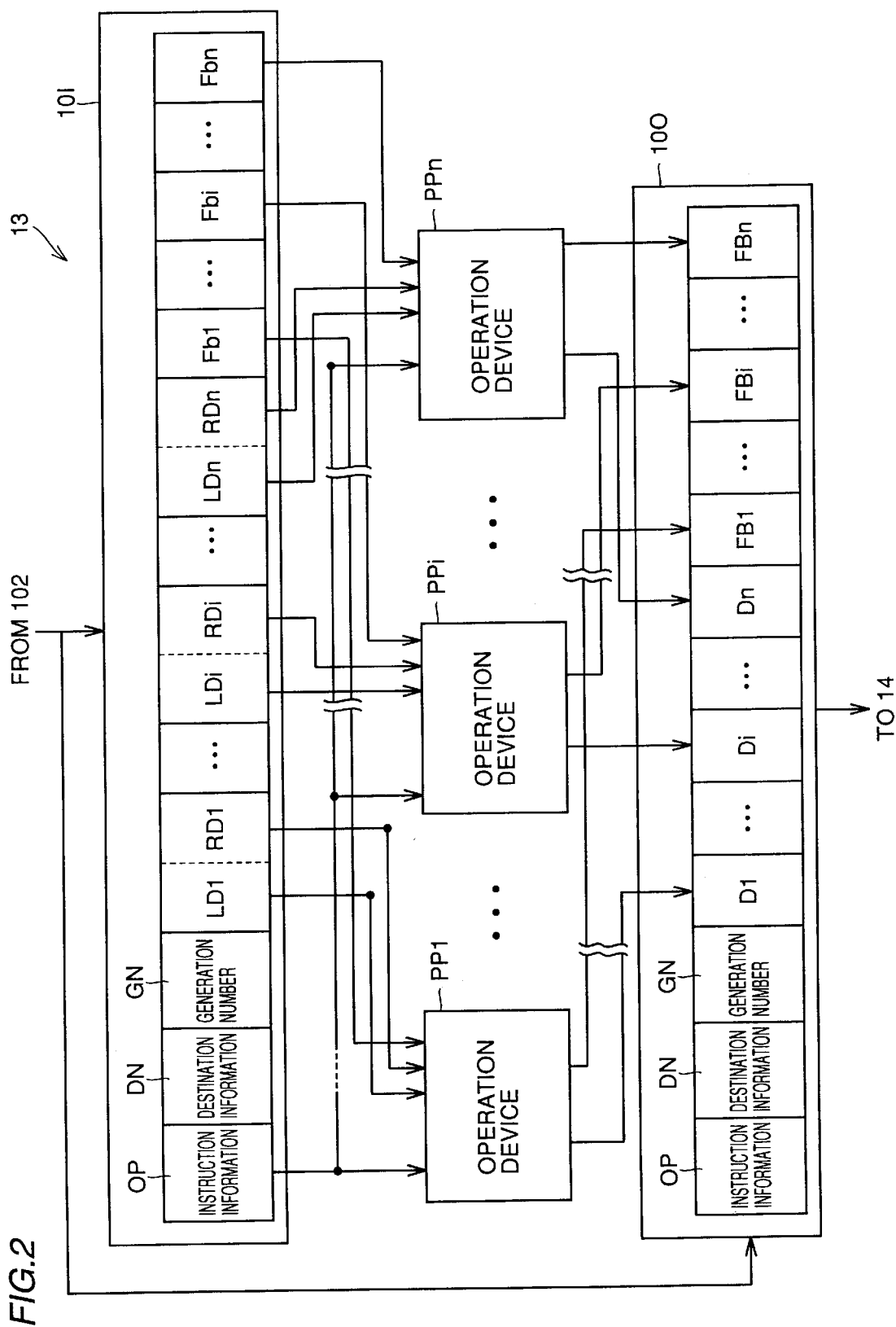
FIG. 2 is a block diagram showing a structure of an operation apparatus 13 of FIG. 1A.

Referring to FIG. 2, operation apparatus 13 includes an input buffer 10I, an output buffer 10O, and a plurality of operation devices PPi (i=1, 2, 3, . . . n) corresponding to each data Di. The data packet stored with the paired data (LDi and RDi) output from paired data detection unit 102 is applied in parallel to input buffer 10I and output buffer 10O, whereby the contents of the applied data packet are stored. For the sake of simplifying the description, it is assumed that flag data Fbi is stored in the data packet applied to operation apparatus 13 from paired data detection unit 102, and flag data FBi is obtained by the processed result of operation apparatus 13.

Figure 3:
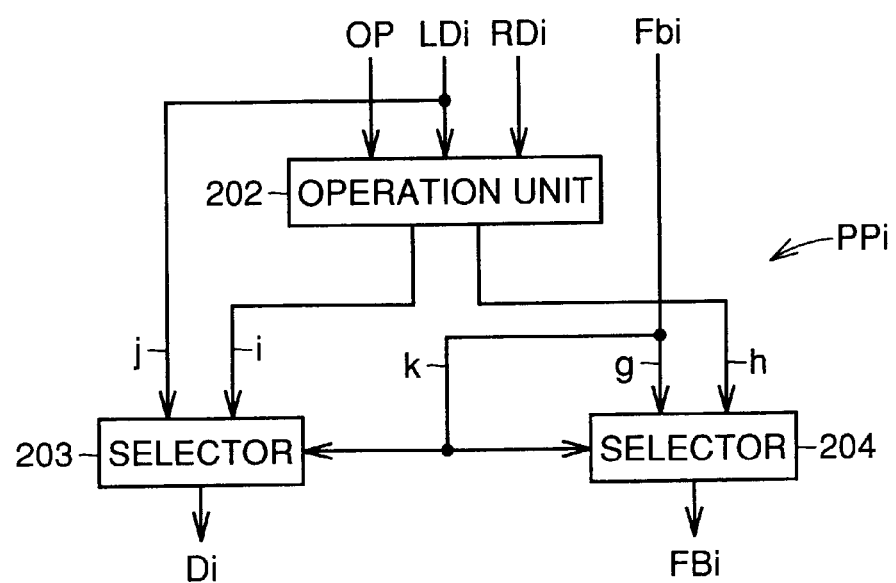
FIG. 3 is a block diagram showing a structure of an operation device PPi of FIG. 2.

Referring to FIG. 3, each operation device PPi of FIG. 2 has a similar structure including an operation unit 202, and selectors 203 and 204. Since selectors 203 and 204 can be implemented by well known art, description thereof is not provided here. Operation device PPi receives instruction operation OP, paired data Di formed of data LDi and RDi, and flag data FBi corresponding to paired data Di of the data packet stored in input buffer 10I. For the sake of simplifying the description of the operation of operation device PPi, the data applied to each component is indicated as data 'g', 'h', 'i', 'j' and 'k' in FIG. 3.

Figure 4:
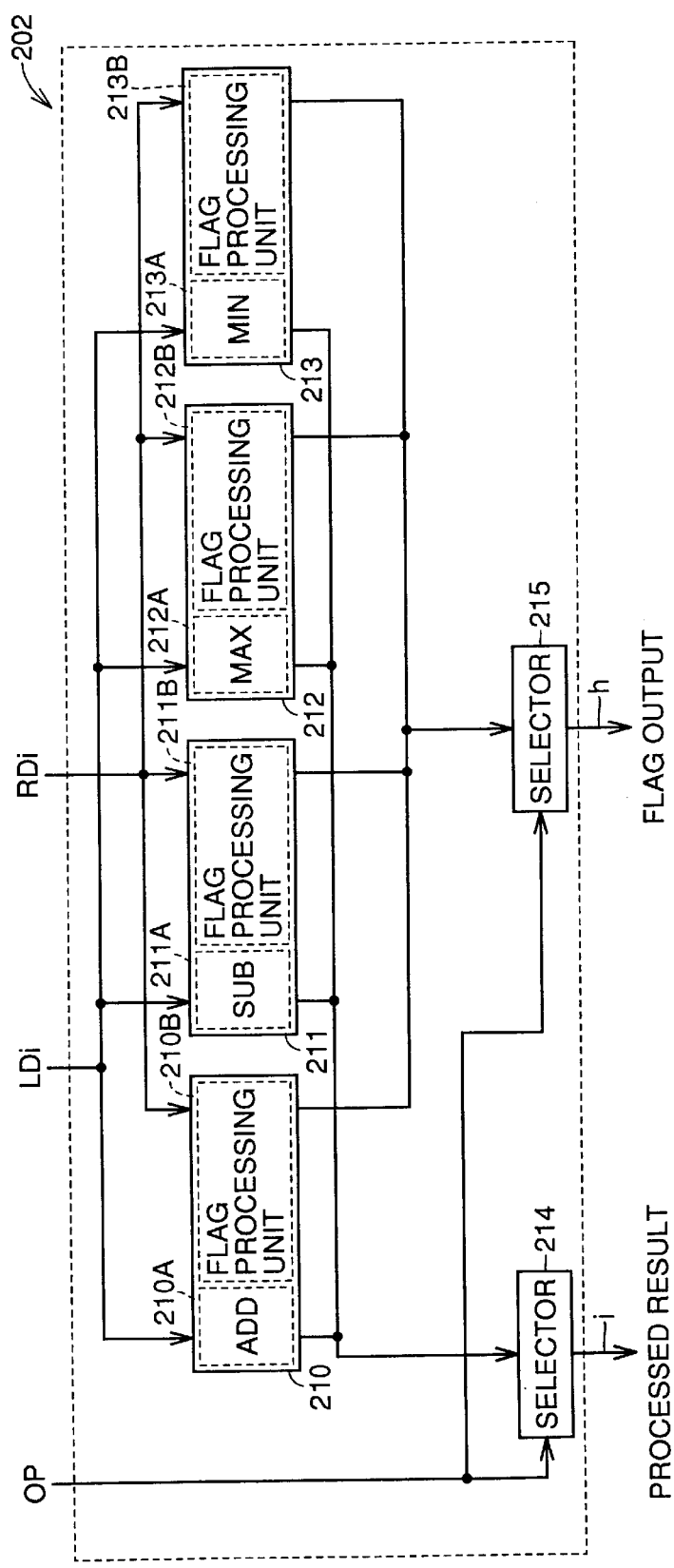
FIG. 4 is a block diagram showing a structure of an operation unit of FIG. 3.

Referring to FIG. 4, operation unit 202 includes operation circuits 210–213, and selectors 214 and 215. Operation circuits 210–213 include operation processing units 210A–213A and flag processing units 210B–213B, respectively. Each of operation processing units 210A–213A receives data LDi and data RDi applied to operation unit 202 to execute an operation process according to an adding instruction (ADD instruction), a subtracting instruction (SUB instruction), an instruction selecting the maximum value (MAX instruction) and an instruction selecting the minimum value (MiN instruction) on the received data. Here, operation processing units 210A–213A are represented as carrying out the aforementioned four types of operations. The type of operations and the number of operation processing units applied are not limited thereto.

Each of flag processing units 210B–213B outputs flag data of one bit to show a value (either 0 or 1) according to the processed result of respective corresponding operation processing units 210A–213A.

Selector 214 receives instruction information OP applied to operation unit 202 and the processed result output from operation processing units 210A–213A to select and output the processed result from the received processed result (refer to data "i" in the drawing) corresponding to the operation instruction indicated by instruction information OP. Selector 215 receives instruction information OP applied to operation unit 202 and the flag data output from flag processing units 210B–213B to select from the input flag data the flag data (refer to data "h" in the drawing) output from the flag processing unit of the operation processing unit corresponding to the operation instruction indicated by instruction information OP and output the selected flag data.

The value corresponding to the processed result (refer to data "i") of the flag data (refer to data "h" in the drawing) output from operation unit 202 is shown in FIGS. 5A–5D in the form of a table. Flag data (refer to data "h" in the drawing) takes the value of either 1 or 0 according to the result of a predetermined operation process based on instruction information OP on input data LDi and RDi.

Selector 203 of FIG. 3 receives data LDi (refer to data "j" in the drawing) applied to operation device PPi, flag data FBi (refer to data "k" in the drawing) and the processed result output from operation unit 202 (refer to data "i" in FIGS. 3 and 4) to select either data LDi or the processed result according to the value of flag data Fbi. The selected data is provided to output buffer 100 as data Di.

Selector 204 receives flag data Fbi applied to operation device PPi (refer to data "g" in the drawings), and the flag data output from operation unit 202 (refer to data "h" in FIGS. 3 and 4) to select either flag data Fbi or the flag data (refer to data "h" in FIGS. 3 and 4) based on flag data Fbi. The selected data is provided to output buffer 100 as flag data FBi.

In the operation of operation device PPi, operation unit 202 executes an operation according to instruction information OP. The obtained processed result (refer to data "i" in the drawing) is applied to selector 203. The flag data to indicate the change in flag data Fbi as a result of the process is applied to selector 204 (refer to data "h"). Selector 203 selects the processed result (refer to data "i") and input data LDi (refer to data "j") when the value of flag data Fbi (refer to data "k") indicates execution of operation and nonexecution of operation, respectively. The data selected by selector 203 is provided to output buffer 100 as data Di.

Selector 204 selects the flag data (data "h") from operation unit 202 and flag data Fbi (data "g") applied to operation device PPi when the value of flag data Fbi (data "k") indicates execution of the operation and nonexecution of the operation, respectively. The selected flag data is provided to output buffer 100 as flag data FBi.

By providing an operation device PPi shown in FIG. 3 for each of the plurality of data Di (paired data of LDi and RDi) in the data packet, n paired data Di that are input can be subjected to the operation process simultaneously according to instruction information OP. When flag data Fbi corresponding to each data Di indicates execution of the operation, the data packet stored with the processed result of data Di (refer to data i and data h) can be output. When flag data Fbi corresponding to each data Di indicates nonexecutable operation, the input data (data LDi and flag data Fbi), not the processed result, i.e. data prior to application of the operation process, is output.

The operation of the data driven information processing apparatus of the first embodiment will be described with reference to FIGS. 6A and 6B in comparison with the operation of the conventional data driven information processor. Each of FIGS. 6A and 6B is a data flow graph in which a data flow program is described. According to the data flow program, the data packet stored with data D1–Dn can be input to execute the process of doubling only the data out of data D1–Dn that is below the threshold value "b". In FIGS. 6A and 6B, each of nodes 205–209 is assigned an instruction code indicated by instruction information OP executed at the relevant node.

In the operation of the conventional data driven information processor of FIG. 6A, each data Di in the input data packet is compared with threshold value b at node 205. The data packets are divided into a data packet storing data Di that is at least threshold value b and a data packet storing data Di that is below threshold value b. Each data packet obtained by the dividing process is output to subsequent nodes 206 and 207 respectively. Then, data Di below threshold value b is multiplied by 2 according to instruction information OP (instruction code MUL) at node 206. The data packet storing that result is applied to node 207. According to instruction operation OP (instruction code PACK) at node 207, the data packet output from node 206 and the data packet output from node 205 are merged to result in the output of one data packet.

In the operation of the data driven information processor of the present invention shown in FIG. 6B, each data Di of the input data packet is compared with threshold value b at node 208. The comparison result is stored in the relevant input data packet as flag data FBi (i=1~n) corresponding to each data Di. That data packet is output to node 209. Here, flag data FBi corresponding to data Di that is below threshold value b is set as 1. At node 209, data Di corresponding to flag data FBi that is "1" in the input data packet is multiplied by 2. Then, the input data packet is output. Here, data Di corresponding to flag data FBi of "0" is output intact.

Thus, when the same process is executed, the number of instructions to be executed is reduced by the absence of the data packet merging process (the process at node 207 in FIG. 6A) in addition to the smaller amount of data packet to be handled by the omission of the dividing process in the data driven information processor of the first embodiment in comparison to the conventional data driven information processor. Thus, the processing speed and processing efficiency are improved in the data driven information processor of the first embodiment.

In the present embodiment, the corresponding flag data FBi is set to "1" for data Di below threshold value b. An operation can be executed similarly by setting the corresponding flag data FBi to "0".

When the processed result is to be obtained for only desired data Di out of a plurality of data Di in the data packet in the conventional case, the data packet has to be divided, which is each subjected to an operation process, followed by the merge of the data packets. In contrast, the processed result can be obtained for data Di without having to divide and merge the data packet with respect to data Di that matches a predetermined condition, i.e. by having corresponding flag data FBi designate reflection of the processed result in the subsequent operation process according to the subsequent instruction information. Accordingly, the processing speed and processing efficiency can be improved since the amount of data in the program and the number of data packets to be processed can be reduced in the data driven information processor.

Second Embodiment

The second embodiment of the present invention is characterized in that data CTL (abbreviation of control) is additionally stored in the data packet, and any of the following cases (1)–(3) is selectable according to the value of data CTL. Case (1) corresponds to execution of the operation for all data Di irrespective of the value of corresponding flag data FBi. Case (2) corresponds to execution of an operation on data Di corresponding to flag data FBi of either "1" or "0" Case (3) corresponds to the nonexecutable operation for all data Di irrespective of the value of corresponding flag data FBi.

The structure of the data driven information processor of the second embodiment is similar to that of the first embodiment except for the provision of an operation apparatus 13A and a program storage unit 14A instead of operation apparatus 13 and program storage unit 14, respectively, of the data driven information processor of the first embodiment. Therefore, description thereof will not be repeated.

Referring to FIGS. 8A and 8B, the data packet of the second embodiment includes a field F52 storing data CTL in addition to the structure of the data packet of the first embodiment shown in FIG. 1B. Data CTL causes selector 203 of FIG. 3 to output the processed result (refer to data "i" in FIG. 3) or the data prior to the process (refer to data "j" in FIG. 3) irrespective of flag data Fbi. Also, data CTL causes selector 204 to output the value of the input flag data Fbi or an inverted value of input flag data Fbi irrespective of flag data Fbi. Data CTL is indicated as data of 2 bits showing the values of "0"–"3". However, the number of bit is not limited thereto.

FIG. 8C shows a program storage region where the data flow program is stored in program storage unit 14A. The data flow program includes a plurality of program data constituted by subsequent instruction information OP, subsequent destination information DN and data CTL. Upon input of the data packet of FIG. 8A, program storage unit 14A reads out subsequent instruction information OP, destination information DN and data CTL from the program storage region (program fetch) according to addressing based on destination information DN in the input data packet. Each read out information is stored in respective fields F1, F2 and F52 of the input data packet. Then, that data packet is output. Accordingly, data CTL is applied to the data packet. Here, data CTL is assigned by the program fetch. Alternatively, data CTL may be provided to the data packet through input unit 100.

Figure 7:
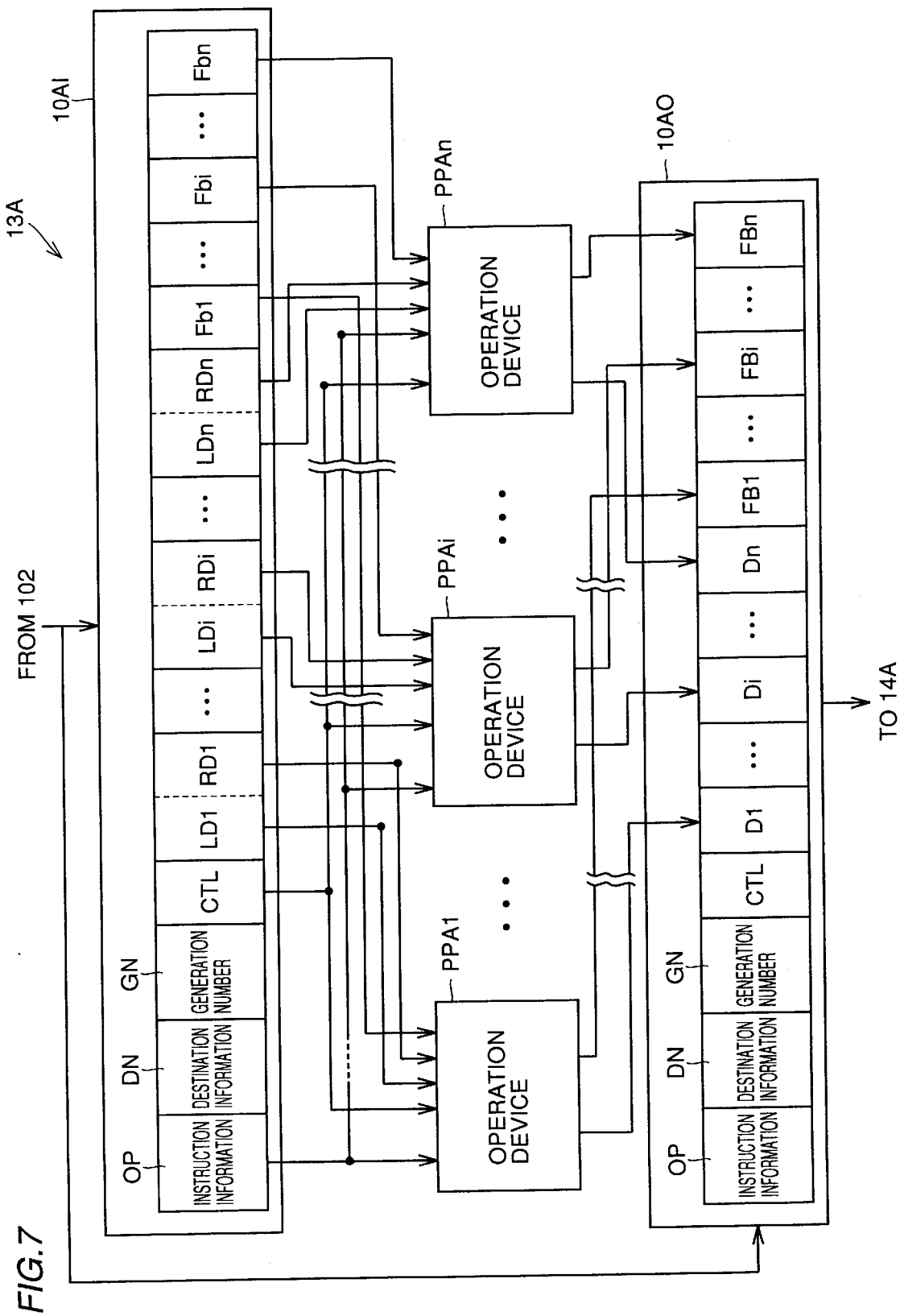
FIG. 7 is a block diagram showing a structure of an operation apparatus 13A according to a second embodiment of the present invention.

Operation unit 13A of FIG. 7 includes an input buffer 10AI, an output buffer 10AO, and an operation device PPAi. The contents of the data packet of FIG. 8A applied to operation apparatus 13A are provided to input and output buffers 10AI and 10AO of FIG. 7 and temporarily stored to be output.

Operation device PPAi of FIG. 9A includes operation unit 202 of FIG. 3, manipulation unit 301, and selectors 302 and 303.

Operation unit 202 is similar to that shown in FIG. 4. Therefore, description thereof will not be repeated.

Selector 302 receives data LDi applied to operation device PPAi, the processed result from operation unit 202, and the output value of manipulation unit 301 to output either data LDi or the processed result according to the output value to be output as data Di. Selector 303 receives flag data Fbi applied to operation device PPAi, the flag data corresponding to the processed result of operation unit 202, and the output value of manipulation unit 301 to output as flag data FBi either input flag data Fbi or the flag data corresponding to the processed result based on the output value of manipulation unit 301.

The output value of manipulation unit 301 is altered as shown in FIG. 9B. Specifically, when data CTL=1 or 2, the manner of a reference of flag data Fbi by selector 302 and 303 is inverted. When data CTL=0 or 3, the operation according to instruction information OP can be set executable or nonexecutable irrespective of the value of the flag data Fbi (unconditionally). By providing one operation device PPAi of FIG. 9A for each data Di (paired data) applied to operation apparatus 103, the input n data Di can be subjected to the operation process at the same time.

The operation by the data driven information processor of the first embodiment and the second embodiment with respect to the same process will be described with reference to FIGS. 10A and 10B. Here, the same process implies a process of adding 1 to the larger of the input data LDi and RDi. FIGS. 10A and 10B show the data flow graph corresponding to the data flow program to execute this process with the data driven information processor of the first and second embodiments.

Referring to FIGS. 10A and 10B, instruction information OP (instruction MAX) is executed to select the maximum value for input data Di (data LDi and RDi) at nodes 304 and 307. At node 305, instruction operation OP to set flag data FBi for the input data is executed (instruction SET FB). At nodes 306 and 308, instruction operation OP to add input data Di (data LDi and RDi) is executed (instruction ADD). At node 308, flag data FBi is ignored.

As shown in FIG. 10A corresponding to the data driven information processor including operation apparatus 13 of the first embodiment, an operation according to instruction operation OP ("MAX") is executed at node 304. At node 305, all flag data FBi in the input data packet are set to "1" according to instruction information OP ("SET FB"). At node 306, 1 can be added to all data Di in the data packet applied to the data driven information processor by executing an operation according to instruction information OP ("ADD").

Referring to FIG. 10B corresponding to the data driven information processor including operation apparatus 13A of the second embodiment, an operation is executed according to instruction operation OP ("MAX") at node 307. At node 308, an operation according to instruction information ("ADD") is executed at node 308. Accordingly, 1 is added to all data Di in the data packet input to the data driven information processor.

More specifically, when instruction information OP ("ADD") is executed on data Di of the input data packet at node 308 shown in FIG. 10B, data CTL in the input data packet is set to "0" by the program fetch of program storage unit 14A or by input unit 100. Accordingly, data Di corresponding to the processed result by operation device PPAi are all output irrespective of the value of flag data FBi in the input data packet at node 307, and 1 can be added to all data Di (all data D1–Dn) at the subsequent node 308.

By comparing the flow graphs of FIGS. 10A and 10B corresponding to the same processing contents, it is appreciated that the reset process of flag data FBi (the process corresponding to SET FB) carried out by the data driven information processor of the first embodiment is eliminated in the data driven information processor of the second embodiment. This means that the data driven information processor of the second embodiment has the number of program steps to be executed reduced corresponding to the eliminated reset process. As a result, the processing speed and efficiency are improved.

By the usage of data CTL in the second embodiment of the present invention, an operation can be carried out on all data Di in the data packet irrespective of the value of flag data FBi (unconditionally) even immediately after execution of the process of instruction information OP designating manipulation of flag data FBi and operation of data Di at the same time. Thus, it is no longer required to prepare individually instruction information OP designating only processing and instruction information OP designating both the manipulation of flag data FBi and operation of data Di with respect to the process of the same contents. Accordingly, the number of types of instructions to be executed at the data driven information processor can be reduced.

Third Embodiment

The third embodiment of the present invention is characterized, in that, by the usage of data FO (flag operation) designating whether or not to manipulate flag data FBi in the data packet, the specification of executable or nonexecutable instruction by flag data FBi can be used, not only in the operation executed immediately thereafter, but also in a plurality of operations executed afterwards.

The data packet of the third embodiment shown in FIGS. 12A and 12B includes a field F53 storing data FO in addition to the field structure of FIG. 8A. Data FO serves to force the flag data output from selector 204 of FIG. 3 to be flag data FBi applied to the operation device. Data FO is set in the data packet by input unit 100 of FIG. 1 or by the program fetch in program storage unit 104B. Although data FO is 1-bit data indicating the value of "0" or "1", the number of bits is not limited thereto.

FIG. 12C shows a program storage region in which a data flow program is stored in program storage unit 14B. As shown in FIG. 12C, the data flow program includes a plurality of program data formed of subsequent instruction information OP, destination information DN, data CTL and data FO. Upon input of the data packet of FIG. 12A, program storage unit 14B has subsequent instruction information OP, destination information DN, data CTL and data FO (program fetch) read out from the program storage region by the addressing based on destination information DN in the input data packet. Respective information read out are stored in fields F1, F2, F52 and F53 in the input data packet, which is then output. Accordingly, data FO is assigned to the data packet. Although description is provided that data FO is assigned to the data packet through program fetching, the data packet may be assigned through input unit 100.

Figure 11:
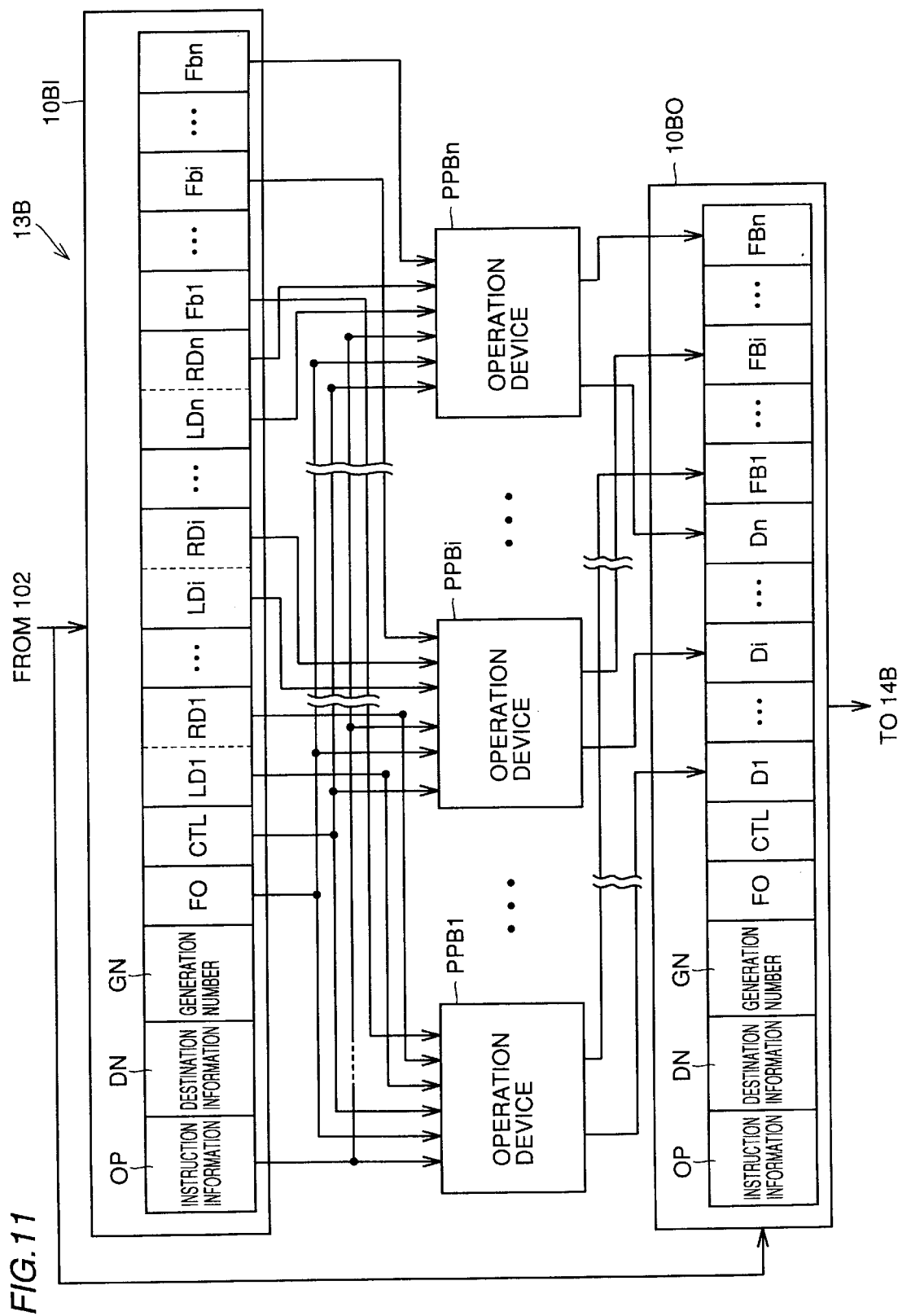
FIG. 11 is a block diagram showing a structure of an operation apparatus according to a third embodiment of the present invention.

Operation apparatus 13B of the third embodiment shown in FIG. 11 includes an input buffer 10BI and an output buffer 10BO, and an operation device PPBi. The contents of the data packet of FIG. 12A applied to operation apparatus 13B are provided to input and output buffers 10BI and 10BO of FIG. 11 and temporarily stored to be output.

Operation device PPBi of FIG. 13A includes operation unit 202, manipulation unit 301 described already, a manipulation unit 401, and selectors 402 and 403. Operation unit 202 and manipulation unit 301 are similar to those already described. Therefore description thereof are not repeated.

Selector 402 receives the processed result from operation unit 202, data LDi of the data packet applied to operation device PPBi, and the output data of manipulation unit 401 to select and output as data Di either data LDi or the processed result according to the output data from manipulation unit 401. Selector 403 receives flag data Fbi applied to operation device PPBi, the flag data based on the processed result output from operation unit 202, and data output from manipulation unit 401 to select either of the two input flag data to be output as flag data FBi based on the output data of manipulation unit 401.

Manipulation unit 401 receives the output value from manipulation unit 301 and data FO. Either the value input from manipulation unit 301 or 0 is applied to selectors 402 and 403 based on the value of data FO as shown in FIG. 13B. Selector 403 is applied with the output value of manipulation unit 301 after manipulation by manipulation unit 401 as shown in FIG. 13B. Therefore, selector 403 outputs flag data Fbi input from operation device PPBi as flag data FBi when data FO is 0 irrespective of the output value from manipulation unit 301, and outputs either flag data Fbi from operation device PPBi or the flag data corresponding to the processed result of operation unit 202 as flag data FBi based on the output value of manipulation unit 301 when data FO is 1.

FIGS. 14A and 14B are data flow graphs according to second and third embodiments, respectively, with respect to the same process. For example, the same process is the process such as doubling data exceeding threshold value "b" and adding 1 for output, and directly providing data Di below threshold value "b" with respect to each data Di in the data packet including data D1–Dn.

The data flow graphs of FIGS. 14A and 14B include nodes 404–410. At nodes 404 and 408, the instruction code (Di>b?) indicated by instruction operation OP is executed. At nodes 405 and 409, a process according to the multiplication instruction code (MUL) of the input data indicated by instruction information OP is executed. At node 406, a process according to the copy instruction code (copy FB) of flag data FBi indicated by instruction information OP is executed. At nodes 407 and 410, the process according to the adding instruction code (ADD) of the input data indicated by instruction operation OP is executed. At node 409, flag data FBi is not changed.

According to the data flow graph of the second embodiment shown in FIG. 14A, at node 404, each data Di of the input data packet of FIG. 12A is compared with threshold value b, and flag data FBi in the input data corresponding to data Di that is greater than threshold value b is set to 1. That input data packet is applied to node 405 (refer to data "m" in FIG. 14A). Data Di smaller than threshold value b has its flag data FBi set to 0. That data packet is applied to node 406 (refer to data "1" in FIG. 14A). At node 404, an operation process (the comparison process between input data Di and threshold value "b") is executed irrespective of the value of flag data FBi since data CTL in the input data packet is set to 0.

At node 405, the data packet output from node 404 is input. At this current stage, flag data FBi is 1 and data CTL is also 1 in the input data packet. Therefore, a multiplication process according to instruction information OP (MUL) corresponding to that node is executed, whereby each data Di in the input data packet is multiplied by 2. That data packet is output to subsequent node 406 (refer to data "p"). Data CTL is preset to 1 for the purpose of properly reflecting the immediately preceding processed result (of node 404) in the multiplication process. The setting of data CTL at 1 causes operation apparatus 13B to refer to the value of the immediately preceding flag data Fbi.

Here, flag data Fbi is set to "1". Therefore, operation apparatus 13B has the flag data of a value corresponding to the processed result output from operation unit 202 selected by selector 303 to be output as flag data FBi. This means that the value of flag data FBi set at the previous node 404 is lost since the value of output flag data FBi is altered. In other words, the processed result of the immediately preceding node (node 404) will not be reflected properly. Thus, by executing an operation process according to instruction operation OP (copy FB) at subsequent node 406, the value of flag data FBi set at the immediately preceding node 404 is retained. More specifically, flag data FBi having a value set at node 404 is input and copied to be stored in field F51 of the applied data packet at node 406, which is then applied to subsequent node 407.

Accordingly, flag data FBi of the data packet (refer to data "p" in FIG. 14A) storing data Di of the processed result according to instruction operation OP (MUL) at node 405 are all returned to 1. The value of the flag data FBi in the data packet (refer to data "1" in FIG. 14A) remains "0".

At subsequent node 407, the applied data packet is input. The contents of the input data packet are processed according to instruction information OP (ADD), whereby the process of adding 1 to data Di with the corresponding flag data FBi of 1, i.e., data Di subjected to multiplication at node 405, is carried out. In order to properly reflect the processed result, data CTL is preset to 1. More specifically, by referring to the previous value of flag data Fbi, selector 303 outputs flag data of a value according to the processed result of operation unit 202 since corresponding flag data FBi is 1 in this case. As to the input data packet (refer to data "1" in FIG. 14A), data Di of the input data packet is not subjected to an adding process at node 407 since corresponding flag data FBi is 0 to be output directly.

The program according to the third embodiment will be described with reference to FIG. 14B.

By the execution of instruction operation OP ((Di>b?) at node 408, data Di of the input data packet is compared with threshold value "b". Since data FO in the input data packet is preset to 1 here, the output of manipulation unit 301 is directly input to selector 403 via selector 401. Therefore, a process similar to that of node 404 in FIG. 14A is carried out. More specifically, each data Di of the input data packet is compared with threshold value "b" at node 408. Data Di greater than threshold value "b" has its flag data FBi set to 1 whereas data Di equal to or below threshold value b has its flag data FBi set to 0. Also, since data CTL in the input data packet is preset to 0, the comparison process between threshold value b and data Di is executed irrespective of the value of flag data FBi in the data packet (unconditionally), and the data packet stored with the comparison result (refer to data "q" in FIG. 14B) is applied to subsequent node 409.

At node 409, the applied data packet is input, and an operation according to instruction information OP (MUL) is executed on the contents of the input data packet. Accordingly, the multiplication process of doubling data Di in the input data packet is executed. Since data CTL in the input data packet is preset to 1, flag data FBi in the input data packet is referred to.

As a result of the reference, data Di below threshold value b has flag data FBi of 0, so that the operation according to instruction operation OP (MUL) is not carried out at node 409 for data Di. Data Di with flag data FBi of 0 is directly output. For data Di greater than threshold value b corresponding to flag data FBi of 1, the process of doubling data Di is executed according to instruction operation OP (MUL) at node 409. It is to be noted that selector 403 receives the output of manipulation unit 401 (=0), not the output from manipulation unit 301 (1: refer to previous flag data FBi) since data FO in the input data packet is preset to 0. More specifically, selector 403 is nonexecutable unconditionally of the operation corresponding to data CTL=3 of FIG. 9B, so that previous flag data Fbi is directly output from selector 403.

Since the signal of manipulation unit 301 is input, selector 402 selects the processed result by operation unit 202 (here, the multiplication result of doubling) to output the selected data as data Di. Thus, the output after the operation process execution according to the multiplication instruction (instruction MUL) that is nonexecutable is directly output since data Di below threshold value b has flag data FBi of 0. In contrast, data Di greater than threshold value "b" is multiplied and the corresponding flag data FBi does not change, i.e., output as 1.

Then, the process according to the adding instruction (instruction ADD) is executed at node 410 to have 1 added to input data Di. Since data Di below threshold value b among the plurality of input data Di has corresponding flag data FBi of 0, the multiplication process is not executed and directly output. Since data Di is greater than threshold value b, data Di subjected to the multiplication process is also subjected to the adding process according to the corresponding flag data FBi of 1, and then output.

At node 410, an adding process (process according to instruction ADD) identical to that of node 407 of FIG. 14A is executed since data CTL is 1 and data FO is 0 likewise node 409 in the input data packet. Therefore, the adding process is executed for input data Di, and flag data output from operation unit 202 having the added processed result reflected is applied as flag data FBi corresponding to input data Di. Then, that data packet is output.

Thus, each of the plurality of input data Di is compared with threshold value b. Data Di below threshold value b is directly output whereas data Di greater than threshold value b is multiplied by 2 and added with 1 to be output.

Comparing the flow graphs of FIGS. 14A and 14B, the process according to the third embodiment of FIG. 14B is reduced in the number of program steps to be executed corresponding to the elimination of the copy process of flag data FBi (the process according to "copy FB") in the process according to the second embodiment of FIG. 14A. Therefore, the processing speed and efficiency are further improved in the data driven information processor of the third embodiment.

By manipulating flag data FBi as described above in the third embodiment, specification of whether to execute or not execute an instruction in response to flag data FBi can be used, not only in the operation executed immediately thereafter, but also in a plurality of operations executed afterwards. Therefore, the process of saving (copying) flag data can be eliminated to prevent reduction of the processing efficiency and increase of the program amount in the data driven information processor.

Fourth Embodiment

The fourth embodiment of the present invention is characterized in that, by using data CNT (count) indicating the number of data that is required to be subjected to an operation process (referred to as "valid data" hereinafter) out of the plurality of data Di in the data packet, the number of the valid data Di out of the plurality of data Di as well as valid data Di can be specified uniquely by data CNT alone.

More specifically, the combination of valid data Di among plurality of data Di is determined by the value of data CNT. Data CNT takes the value of nx which is any of 0, 1, 2, . . . n. For example, value nx=0 indicates that there is no valid data Di in plurality of data Di. When value nx=1, only data D1 is the valid data. When value nx is 2, 3, . . . or n, nx data among data D1–data Dnx are the valid data.

FIGS. 15A–15E show the field structure of data packets and a program region accessed according to the contents of these data packets according to the fourth embodiment. The data packet of FIG. 15A includes fields F1, F2, F3, F4 and F54 storing instruction information OP, destination information DN, generation number GN, plurality of data Di, and data CNT, respectively. The data packets of FIGS. 15B–15D have field F54 in which data CNT is stored in addition to the field configuration of the data packet of the previous first to third embodiments.

For the sake of simplifying the description in the data driven information processor of the fourth embodiment, it is assumed that information processing is executed using the data packet of FIG. 15B.

FIG. 15E shows the program storage region in which the data flow program is stored in program storage unit 14C in the data driven information processor of the fourth embodiment. The data flow program includes a plurality of program data formed of subsequent instruction information OP, destination information DN and data CNT. Upon input of the data packet of FIG. 15B, program storage unit 14C reads out from the program storage region the subsequent instruction information OP, the subsequent destination information DN and data CNT (program fetch) according to addressing based on destination information DN in the input data packet. The read out information are stored in respective fields F1, F2 and F54 of the input data packet. Then, that data packet is output. Thus, data CNT is applied in the data packet. Although data CNT is applied to the data packet by program fetching here, data CNT may be applied to the data packet through input unit 100.

Data CNT has a bit length indicating the maximum number of data Di in the corresponding data packet. Field F54 includes the relevant bit length.

Figure 16:
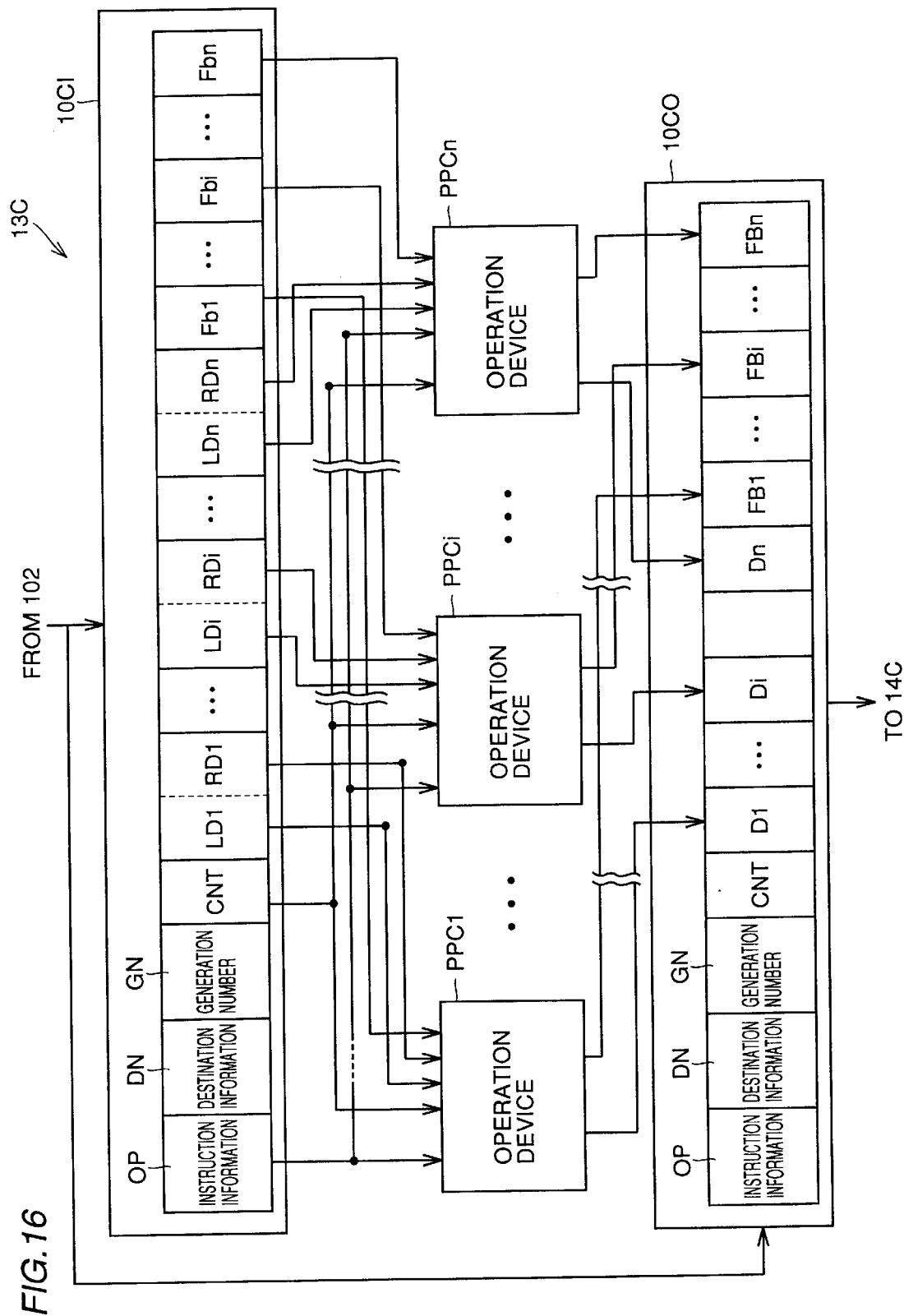
FIG. 16 shows a structure of an operation apparatus 13C according to the fourth embodiment of the present invention.
Figures 17A, 17B:
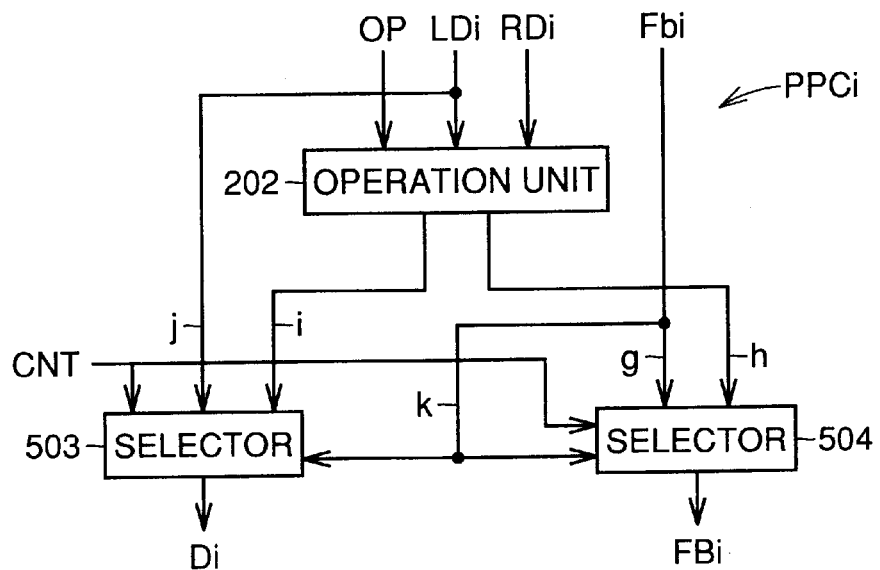
FIGS. 17A and 17B are diagrams to describe the structure and operation of operation device PPCi of FIG. 16.

FIG. 16 shows a structure of an operation apparatus 13C according to the fourth embodiment of the present invention. FIGS. 17A and 17B represent the structure and operation of an operation device PPCi of FIG. 16. In FIG. 17B, variable "i"=1~n. Data CNT has the range of 1, 2, 3, . . . n.

The case where the constituent element corresponding to data CNT is added to the structure of the first embodiment will be described hereinafter. As to the application of data CNT to other embodiments, a similar process can be executed by adding the constituent element corresponding to data CNT as in the present embodiment.

Operation apparatus 13C according to the fourth embodiment shown in FIG. 16 includes an input buffer 10CI and an output buffer 10CO and an operation device PPCi. Input and output buffers 10CI and 10CO receive and temporarily store the data of the data packet of FIG. 15B applied to operation apparatus 13C to be output.

Referring to FIG. 17A, operation device PPCi includes an operation unit 202 similar to those already described and selectors 503 and 504. Selector 503 receives data CNT in addition to the data input to selector 203 of FIG. 3. Selector 503 selects and outputs as data Di the processed result output from corresponding operation unit 202 when data CNT≦n and data LDi applied to operation device PPCi when data CNT>n as shown in FIG. 17B. Selector 504 receives data CNT in addition to the data input to selector 204 of FIG. 3. Selector 504 selects and outputs as flag data FBi the flag data according to the processed result of operation unit 202 when data CNT≦n and flag data Fbi previous to the application of operation device PPCi when CNT>n.

Figure 18D:
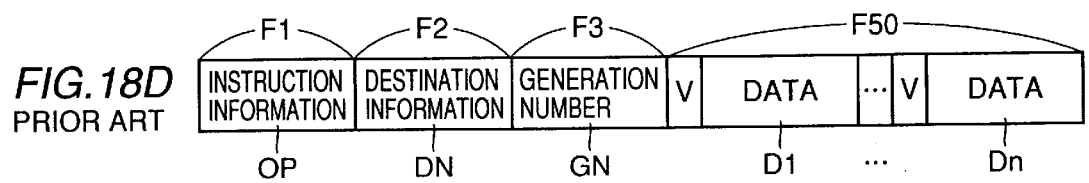

Consider the case where each data Di in the data packet provides indication of valid data or invalid data. Flag V is required for each data Di in the conventional data packet (refer to FIG. 18D) whereas the number of valid data in the plurality of data Di is specified by data CNT according to the data packet of the fourth embodiment with the structure of FIG. 15A. Therefore, when the number n of data Di in the data packet is three or more, the length of the data packet can be reduced according to the fourth embodiment than in the conventional case. For example, when n=3, the length of 3 bits is conventionally required to store flag V in the data packet. In the fourth embodiment of the present invention, only 2 bits is required to store data CNT in the data packet (bit length that can indicate "11" to represent the maximum value 3). Thus, the length can be reduced by 1 bit than the conventional case.

By using data CNT indicating the number of valid data in numeric in the fourth embodiment, the length of the data packet can be reduced in the case where the maximum number of data Di stored per one data packet is at least three. Thus, the width of the packet transmission path in the data driven information processor can be reduced to render the processor compact.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor comprising:
   a paired data detection unit sequentially receiving a data packet including at least a destination field to store destination information, an instruction field to store instruction information, and a data field to store a plurality of data independent of each other to (i) detect two different said received data packets forming a pair, (ii) store contents of the data field of one received packet detected as the pair into the data field of the other data packet detected as the pair, and (iii) output said other data packet,
   a processing unit receiving said data packet output from said paired data detection unit to (i) apply an operation process individually on each of the plurality of data in said data field of said received data packet according to said instruction information in said instruction field of said received data packet, and (ii) output said received data packet, and
   a control unit including a program storage unit storing a data flow program including a plurality of said instruction information and said destination information to (i) receive said data packet output from said processing unit, (ii) store subsequent said instruction information and subsequent said destination information read out from said program storage unit into said instruction field and said destination field, respectively, in said received data packet, and (iii) output said received data packet to at least said paired data detection unit,
   said data packet further including a reflect designation field in which is stored reflect designation information designating whether to reflect the result of said operation process on data in the operation process according to said subsequent instruction information for each of said plurality of data in said data field,
   wherein said processing unit comprises for each of said plurality of data in said received data packet
   data select means for (i) selecting relevant data in response to corresponding said reflect designation information designating non-reflection, and selecting said operation processed result of said relevant data in response to corresponding said reflect designation information designating reflection, and (ii) storing the selected result into said data field of said received data packet, and
   information select means for (i) selecting relevant reflect designation information in response to corresponding said reflect designation information designating non-reflection and selecting said reflect designation information set with contents according to said operation processed result in response to designation of reflection, and (ii) storing the selected reflect designation information into said reflect designation field in said received data packet.

2. The data driven information processor according to claim 1, said data packet further including a manipulation field in which is stored manipulation information to manipulate contents of said reflect designation information in said reflect designation field,
   wherein said processing unit further comprises manipulation means, for each of said plurality of data in said data packet received by said processing unit,
   said manipulation means manipulating contents of said reflect designation information corresponding to relevant data based on said manipulation information of the received data packet to apply manipulated said reflect designation information to at least one of said data select means and said information select means.

3. The data driven information processor according to claim 1, wherein said data packet further includes a data number field having a bit length that can indicate the number of said plurality of data to store data number information indicating the number of data required to be subjected to said operation process out of said plurality of data for said plurality of data in said data field,
   said data select means and said information select means corresponding to the number of data indicated by said data number information out of said plurality of data being operated in said processing unit.

4. The data driven information processor according to claim 3, wherein data required to be subjected to said operation process being identified out of said plurality of data in said data field by said data number information.

5. A data driven information processor comprising:

a paired data detection unit sequentially receiving a data packet including at least a destination field to store destination information, an instruction field to store instruction information, and a data field to store a plurality of data independent of each other to (i) detect two different said received data packets forming a pair, (ii) store contents of the data field of one received packet detected as the pair into the data field of the other data packet detected as the pair, and (iii) output said other data packet, a processing unit receiving said data packet output from said paired data detection unit to (i) apply an operation process individually on each of the plurality of data in said data field of said received data packet according to said instruction information in said instruction field of said received data packet, and (ii) output said received data packet, and a control unit including a program storage unit storing a data flow program including a plurality of said instruction information and said destination information to (i) receive said data packet output from said processing unit, (ii) store subsequent said instruction information and subsequent said destination information read out from said program storage unit into said instruction field and said destination field, respectively, in said data packet, and (iii) output said received data packet to at least said paired data detection unit, said data packet further including a data number field having a bit length corresponding to the number of said plurality of data in said data field to store data number information indicating the number of data required to be subjected to said operation process out of said plurality of data for each of said plurality of data in said data field, wherein a result of said operation process is output to only the number of data indicated by said data number information out of said plurality of data in said processing unit.

6. The data driven information processor according to claim 5, wherein data required to be subjected to said operation process is identified out of said plurality of data in said data field by said data number information.

* * * * *